(12) United States Patent
Kasami et al.

(10) Patent No.: US 7,042,860 B2
(45) Date of Patent: May 9, 2006

(54) WIRELESS COMMUNICATION SYSTEM, WEIGHT CONTROL APPARATUS, AND WEIGHT VECTOR GENERATION METHOD

(75) Inventors: Hideo Kasami, Yokohama (JP); Shuichi Obayashi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 806 days.

(21) Appl. No.: 09/984,713

(22) Filed: Oct. 31, 2001

(65) Prior Publication Data
US 2002/0051430 A1    May 2, 2002

(30) Foreign Application Priority Data
Oct. 31, 2000    (JP)    ............... 2000-333202

(51) Int. Cl.
*H04Q 7/00*    (2006.01)
(52) U.S. Cl. .................. 370/334; 370/332; 370/339
(58) Field of Classification Search ................ 370/310, 370/328–329, 332, 334, 339
See application file for complete search history.

(56) References Cited

U.S. PATENT DOCUMENTS

| | | | |
|---|---|---|---|
| 6,047,189 A | 4/2000 | Yun et al. | |
| 6,067,290 A | 5/2000 | Paulraj et al. | |
| 6,308,085 B1 | 10/2001 | Shoki | |
| 6,347,234 B1* | 2/2002 | Scherzer ............... | 455/562.1 |
| 6,765,898 B1* | 7/2004 | Bloch .................. | 370/342 |
| 2001/0020918 A1* | 9/2001 | Takai .................... | 343/729 |

FOREIGN PATENT DOCUMENTS

| | | |
|---|---|---|
| EP | 1 124 281 | 8/2001 |
| GB | 2 322 051 | 8/1998 |
| GB | 2 349 045 | 10/2000 |
| JP | 9-200115 | 7/1997 |
| JP | 9-219615 | 8/1997 |
| JP | 10-303808 | 11/1998 |
| JP | 2000-101552 | 4/2000 |
| JP | 2000-332667 | 11/2000 |
| JP | 2001-298389 | 10/2001 |

OTHER PUBLICATIONS

U.S. Appl. No. 09/559,573, filed Apr. 28, 2000, Pending.

* cited by examiner

*Primary Examiner*—Huy D. Vu
*Assistant Examiner*—Jason Mattis
(74) *Attorney, Agent, or Firm*—Oblon, Spivak, McClelland, Maier & Neustadt, P.C.

(57) ABSTRACT

Signals received by a plurality of antenna elements are supplied to a beam forming circuit via a distributor. The beam forming circuit weights and combines the signals to output a reception signal corresponding to a beam having a predetermined directionality pattern. A weight used to control weighting and combining is set by a weight controller. Upon receiving a registration request from an unregistered terminal, the weight controller calculates a weight vector used to form a beam having null directionality toward that terminal, and maximum directionality toward the range of an area other than an area where the terminal is located of a plurality of areas obtained by dividing the area covered by the antenna elements in accordance with direction.

6 Claims, 14 Drawing Sheets

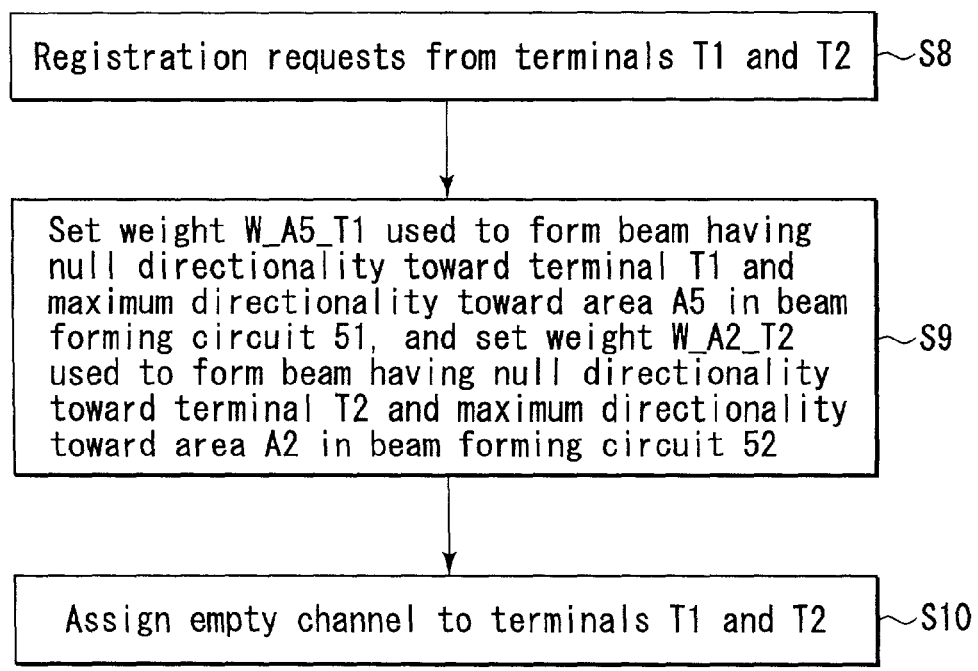

| Terminal | Area to which terminal belongs |
|----------|-------------------------------|
| T1 | A2 |
| T2 | A5 |
| | |
| | |

FIG. 10

Registration requests from terminals T1 and T2 —S8

Set weight W_A5_T1 used to form beam having null directionality toward terminal T1 and maximum directionality toward area A5 in beam forming circuit 51, and set weight W_A2_T2 used to form beam having null directionality toward terminal T2 and maximum directionality toward area A2 in beam forming circuit 52 —S9

Assign empty channel to terminals T1 and T2 —S10

FIG. 11

Reception          Reception
output of 3001    output of 3002

WIRELESS COMMUNICATION SYSTEM, WEIGHT CONTROL APPARATUS, AND WEIGHT VECTOR GENERATION METHOD

CROSS REFERENCE TO RELATED APPLICATIONS

This application is based upon and claims the benefit of priority from the prior Japanese Patent Application No. 2000-333202, filed Oct. 31, 2000, the entire contents of which are incorporated herein by reference.

BACKGROUND OF THE INVENTION

1. Field of the Invention

The present invention relates to a wireless communication system for making space-division multiple access, a weight control apparatus, and a weight vector generation method.

2. Description of the Related Art

In an FWA (Fixed Wireless Access) system, a base station and fixed terminal station make wireless, high-speed communications. In a point-to-multipoint (P-MP) system, a base station communicates with a plurality of fixed stations. In the P-MP system, space-division multiplex access (SDMA) is known as means for increasing the subscriber capacity. As shown in FIG. 16, an adaptive array 1002 arranged in a base station 1001 forms orthogonal beams that do not interfere with each other. These beams allow simultaneous communications of a plurality of terminals 1003.

FIG. 17 shows an arrangement of the adaptive array 1002 when the multiplexing degree=2. In beam forming circuits 1051 and 2051, appropriate weight vectors are set in weighting devices 1501 to 1504 and 2501 to 2504. These weighting devices and combiners 1512 and 2512 weight and combine the outputs from antenna elements 1011 to 1014, thereby forming orthogonal beams having maximum directionality toward one terminal, and null directionality toward the other terminal.

The same applies to a case wherein the multi-plexing degree is more than 3. That is, orthogonal beams are formed to have maximum directionality toward the objective terminal, and null directionality toward a plurality of remaining terminals.

In the conventional system, weights for forming orthogonal beams used to attain space-division multiplex access are individually calculated and held in correspondence with all combinations of terminals while considering the multiplexing degree for a given number of base stations. For example, when the multiplexing degree=2 and the total number of terminals=n, the number of combinations of weights to be calculated and held as combinations of terminals is n×(n−1). Therefore, the number of combinations of weights to be held becomes huge with increasing number of registered terminals which must undergo space-division multiplex access.

A wireless communication system that makes packet communications by CSMA/CA is known.

FIG. 22 shows the arrangement of an IEEE802.11 wireless LAN system using CSMA/CA. A base station 900 senses carriers before transmission of packets to a terminal 911. Upon receiving packets containing channel reserve information from a terminal 913, the base station 900 postpones packet transmission during that reserved period. After that, the base station 900 waits for a random time period (back-off process) calculated by a controller 901, and transmits packets addressed to a target terminal 911. If the received data is correct, the target terminal 911 transmits an acknowledge response packet (ACK) to the base station after an elapse of a predetermined period of time. If the base station 900 fails to receive ACK from the target terminal 911 after an elapse of a predetermined period of time, it executes the back-off process using the controller 901 and transmits data again.

On the other hand, an adaptive array can improve communication quality by forming beams that reduce interference from a neighboring cell, as shown in FIG. 23.

The adaptive array generally makes beam control on the basis of a received signal. For example, a direction-constrained power minimization method suppresses all received signals as interfering signals while holding the gain in a specific direction. Therefore, if a situation in which only an interference wave from a neighboring cell arrives is formed, and the direction-constrained power minimization method is used in this situation, beams that can cover a specific area in the self cell and can remove the interference wave can be formed.

However, in order to suppress all co-channel interference waves from a neighboring cell, the number of antenna elements must be increased, resulting in a large apparatus scale.

Since the IEEE802.11 wireless LAN system using CSMA/CA does not make integrated control of packet transmission, as described above, it is difficult to form a situation in which only terminals or base stations to be suppressed transmit packets. As a result, a terminal of the self cell transmits packets in place of the terminal or base station to be suppressed, and unwanted beams that suppress such packets are formed.

BRIEF SUMMARY OF THE INVENTION

The present invention has been made in consideration of the above situation, and has as its object to provide a wireless communication system, weight control apparatus, and weight vector generation method, which can prevent the number of weights to be held from increasing abruptly even when the number of terminals increases, since orthogonal beams are not prepared in correspondence with combinations of terminals upon space-division multiplex access.

It is another object of the present invention to reduce the apparatus scale by limiting the number of interference waves to be suppressed in a wireless communication system that makes packet communications using CSMA/CA, and to form a situation in which only interference waves to be suppressed are present so as to form beams which remove these interference waves.

According to one aspect of the present invention, there is provided a wireless communication system which allows simultaneous communications with a plurality of terminals by space-division multiplex access, comprising: a plurality of antenna elements that receive a signal transmitted from the terminals; a plurality of beam forming units configured to output reception signals corresponding to beams having predetermined directionality patterns by weighting and combining reception signals received by the plurality of antenna elements; and a controller configured to set weight vectors used to control weighting and combining in the plurality of beam forming units, wherein when the controller receives a registration request from an unregistered terminal, the controller calculates and stores at least one of the weight vectors used to form a beam having null directionality toward the unregistered terminal and maximum directionality toward a specific area other than an area where the unregistered terminal is located of areas obtained by dividing a cover area covered by the wireless communication system.

BRIEF DESCRIPTION OF THE SEVERAL VIEWS OF THE DRAWING

FIG. 10 is a table showing an example of the storage contents of a correspondence storage unit according to the first embodiment;

FIG. 11 is a flow chart showing an example of a space-division multiplex access sequence for two terminals according to the first embodiment;

DETAILED DESCRIPTION OF THE INVENTION

Embodiments of the present invention will be described hereinafter with reference to the accompanying drawings.

(First Embodiment)

Figure 1:
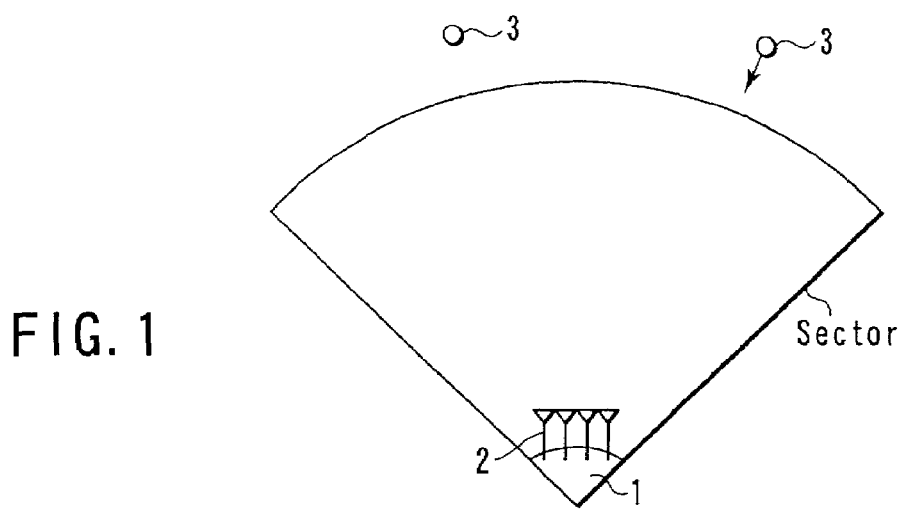
FIG. 1 is a view for explaining an FWA system according to the first embodiment of the present invention.

FIG. 1 shows an example of an FWA (Fixed Wireless Access) system including a base station 1 to which the first embodiment of the present invention is applied.

A base station 1 comprises an adaptive array (wireless communication system) 2, and can make simultaneous communications with a plurality of terminals 3 via a single channel by avoiding interference between terminals using the adaptive array 2. Note that FIG. 1 illustrates a 90° sector, but the present invention is not limited to this.

Note that this embodiment will exemplify space-division multiplex access (SD MA) of two terminals using an adaptive array consisting of four antenna elements.

Figure 2:
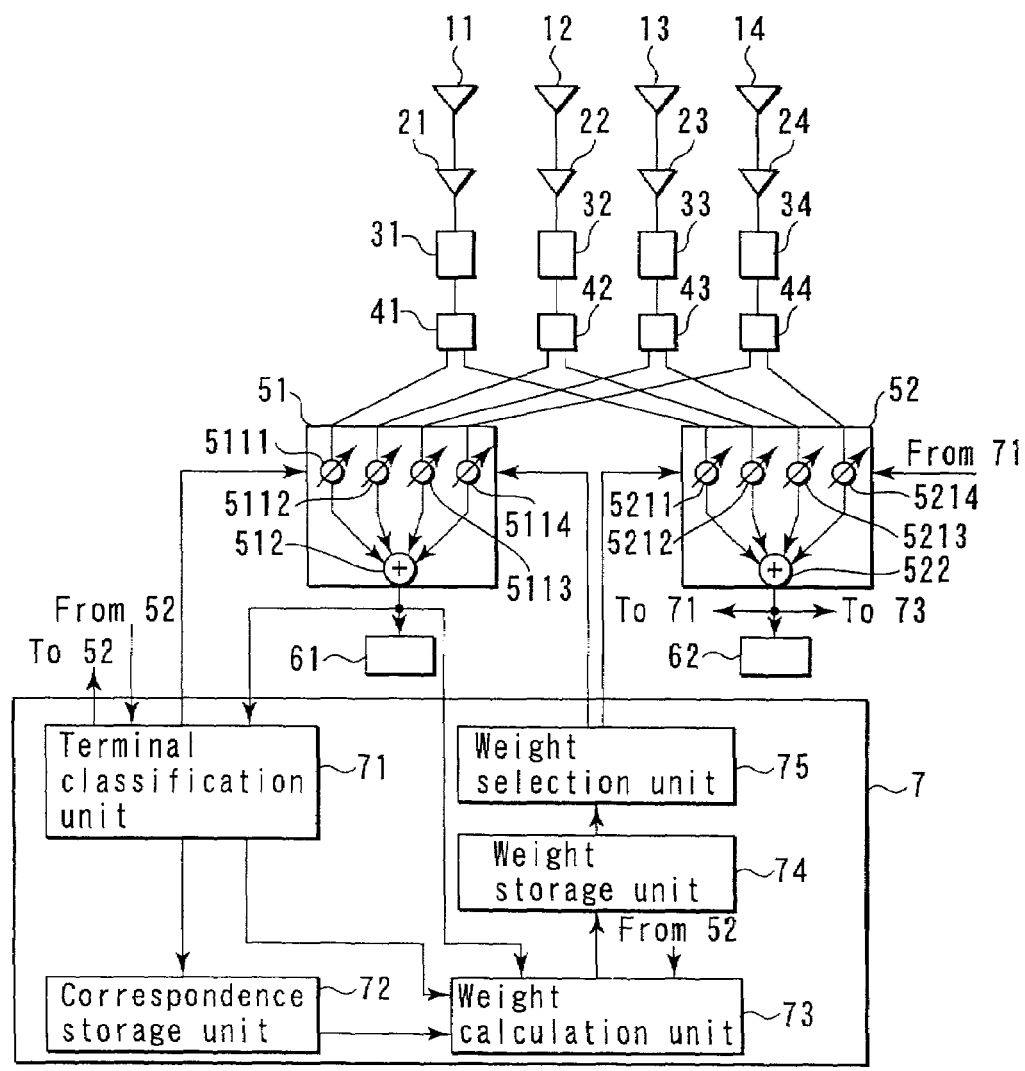
FIG. 2 is a block diagram showing an example of the arrangement of an adaptive array according to the first embodiment.

FIG. 2 shows an example of the arrangement of the adaptive array arranged in the base station according to this embodiment.

As shown in FIG. 2, the adaptive array of this embodiment comprises m (m is a plural number; m=4 in FIG. 2) antenna elements 11 to 14, m amplifiers (low noise amplifiers) 21 to 24, m frequency converters 31 to 34, m distributors 41 to 44, n (n is a plural is number; n=2 in FIG. 2) beam forming circuits 51 and 52, n receivers 61 and 62, and a weight controller 7.

The beam forming circuit 51 includes m weighting devices 5111 to 5114, and a combiner 512. Likewise, the beam forming circuit 52 includes m weighting devices 5211 to 5214 and a combiner 522.

Furthermore, the weight controller 7 includes a terminal classification unit 71, terminal storage unit 72, weight calculation unit 73, weight storage unit 74, and weight selection unit 75.

Note that the base station may comprise a plurality of adaptive arrays shown in FIG. 2. For example, when the adaptive array shown in FIG. 2 covers a 90° sector, the base station can cover 360° full directions if it comprises four adaptive arrays.

In the adaptive array shown in FIG. 2, reception signals received by the antenna elements 11 to 14 are respectively input to the corresponding amplifiers 21 to 24. The amplifiers 21 to 24 respectively amplify the reception signals.

The reception signals amplified by the amplifiers 21 to 24 are respectively input to the corresponding frequency converters 31 to 34. The frequency converters 31 to 34 respectively convert the frequency bands of the reception signals from radio frequency (RF) to intermediate frequency (IF) or baseband (BB).

The reception signals frequency-converted by the frequency converters 31 to 34 are respectively input to the corresponding distributors 41 to 44. The distributors 41 to 44 distribute the reception signals and output them to the beam forming circuits 51 and 52.

In this way, the beam forming circuit 51 receives the reception signals received by the antenna elements 11 to 14 from the distributors 41 to 44. The same applies to the beam forming circuit 52.

The reception signals input to the beam forming circuit 51 are respectively weighted by the weighting devices 5111 to 5114, and are then combined by the combiner 512. The combined signal is sent to the receiver 61. The same applies to the beam forming circuit 52.

The weights in the weighting devices 5111 to 5114 and 5211 to 5214 are appropriately set by the weight controller 7.

In the above description, the reception signals are analog signals. Also, using A/D converters and the like, weighting can be done in a digital signal domain.

The weight controller 7 will be described in detail below.

Figure 3:
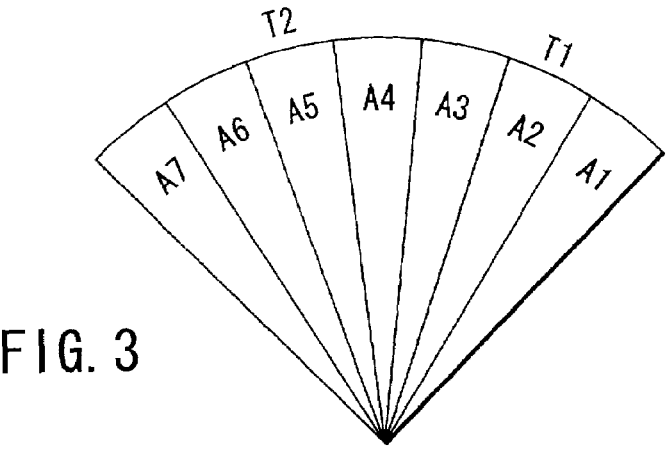
FIG. 3 shows a cover area of a base station according to the first embodiment, which is divided into a plurality of areas.

Note that this embodiment will examine a case wherein the cover area (by the adaptive array in FIG. 2) of the base station is divided into a plurality of areas in accordance with direction viewed from the base station, as shown in FIG. 3, and a given terminal belongs to one of the plurality of areas. FIG. 3 exemplifies a case wherein when the cover area of the base station is divided into seven areas A1 to A7, a terminal T1 belongs to the area A2, and a terminal T2 belongs to the area A5. The area configuration shown in FIG. 3 will be taken as an example in the following description. Of course, the present invention may be applied even when the cover area is divided into another number of areas, or when the cover area is divided unequally.

The terminal classification unit 71 in the weight controller 7 estimates one of the plurality of areas obtained by dividing the cover area of the base station, where the target terminal 3 is located (one of the areas A1 to A7 in FIG. 3) on the basis of the reception signal from the terminal 3.

After the area to which the terminal 3 belongs is estimated, a correspondence between identification information for identifying the terminal 3, and identification information for identifying the area to which the terminal 3 belongs, and which is estimated by the terminal classification unit 71 is stored as terminal-area correspondence information in a correspondence storage unit 72 (see FIG. 10; FIG. 10 shows an example of the contents after the terminals T1 and T2 have been registered, as will be described later).

The weight calculation unit 73 calculates a weight for forming a beam having null directionality toward the terminal 3 and maximum directionality toward the range of a specific area other than the area to which the terminal 3 belongs, on the basis of the contents of the terminal-area correspondence information stored in the correspondence storage unit 72 using the reception signal from the terminal 3 (null directionality points to that terminal, while maximum directionality points to (one of directions) the range of the corresponding area). This weight is calculated for a case wherein each of all areas other than the area to which the terminal 3 belongs or each of areas that satisfy a predetermined condition other than the area to which the terminal 3 belongs is assumed to be the specific area. In the example of the arrangement shown in FIG. 2, the weight is a four-dimensional vector.

The weights calculated by the weight calculation unit 73 are stored in the weight storage unit 74 so that the corresponding terminal (i.e., a terminal to which null directionality is pointed) and the corresponding area (an area to which maximum directionality is pointed) can be specified.

Upon making space-division multiplex access (SDMA) for two terminals, when the weight used to form a beam having null directionality toward the second terminal and maximum directionality toward the range of the area to which the first terminal belongs, and the weight used to form a beam having null directionality toward the first terminal and maximum directionality toward the range of the area to which the second terminal belongs, are stored in the weight storage unit 74, the weight selection unit 75 sets these two weights respectively in the weighting devices 5111 to 5114 of the beam forming circuit 51 and the weighting devices 5211 to 5214 of the beam forming circuit 52. In this fashion, even when an identical channel is used, the beam forming circuit 51 can supply the reception output from the first terminal to the receiver 61, and the beam forming circuit 52 can supply the reception output from the second terminal to the receiver 62 (of course, correspondence between the terminals and the beam forming circuits/receivers may be reversed). In the example of FIG. 3, these two weights correspond to a weight used to form a beam having null directionality toward the terminal T2 and maximum directionality toward the range of the area A2 to which the terminal T1 belongs, and a beam having null directionality toward the terminal T2 and maximum directionality toward the range of the area A5 to which the terminal T2 belongs.

The arrangement of the terminal classification unit 71 will be described in more detail below.

Figure 4:
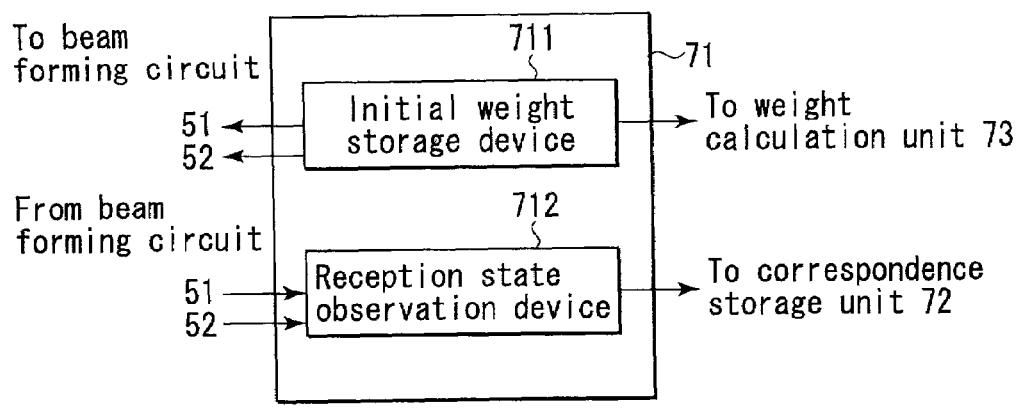
FIG. 4 is a block diagram showing an example of the arrangement of a terminal classification unit of the adaptive array according to the first embodiment.

FIG. 4 shows an example of the internal arrangement of the terminal classification unit 71.

An initial weight storage device 711 stores a weight used to form a beam having maximum directionality toward the corresponding area (in a direction of, e.g., its central portion), as an initial weight for each of the plurality of areas obtained by dividing the cover area of the base station. For example, in case of FIG. 3, seven different initial weights, i.e., an initial weight used to form a beam having maximum directionality toward the area A1, . . . , an initial weight used to form a beam having maximum directionality toward the area A7, are stored. Note that the initial weights do not particularly consider the directions of null directionality.

B1, B2, B3, . . . , B7 respectively represent beams having maximum directionality toward the areas A1, A2, A3, . . . , A7, and W1, W2, W3, . . . , W7 represent weights used to form these beams B1, B2, B3, . . . , B7.

Figure 5:
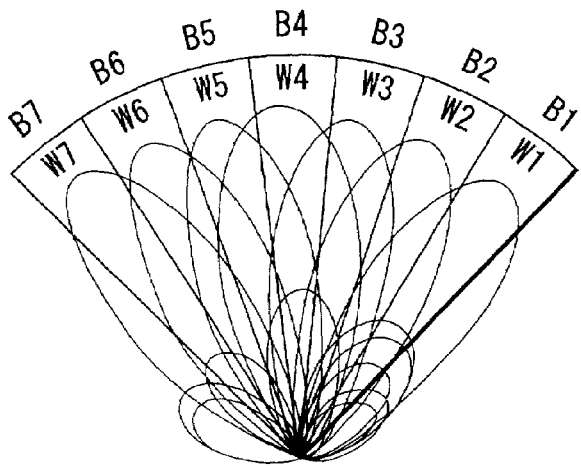
FIG. 5 shows beams formed by initial weights according to the first embodiment.

FIG. 5 exemplifies the states of the beams B1, B2, B3, . . . , B7 formed using the weights W1, W2, W3, . . . , W7.

A reception state observation device 712 observes a signal from the terminal 3 when upon setting the initial weights stored in the initial weight storage device 711 in the weighting devices 5111 to 5114 of the beam forming circuit 51, and determines an area to which maximum directionality of a beam that can assure the best reception state of the signal from the terminal 3 (i.e., an area pointed by maximum directionality of a beam formed by the initial weight used in that state) is pointed as an area to which the terminal 3 belongs. The reception state observation device 712 outputs, as the observation result, identification information of the terminal, and that of the area to which that terminal belongs, to the correspondence storage unit 72.

Note that the "best reception state" evaluated by the reception state observation device 712 is a reception state with maximum reception power. Alternatively, for example, the best reception state may be defined as a reception state with a maximum signal to noise power ratio.

In the above description, the beam forming circuit 51 is used in observation. Of course, the beam forming circuit 52 may be used. Also, one of the beam forming circuits 51 and 52 may be fixedly used, or may be selected by a predetermined method in each observation. Furthermore, different initial weights may be set in the two beam forming circuits to observe signals parallel to each other. In this way, the time required for evaluation can be shortened.

With the aforementioned arrangement, an area in which the terminal is currently located can be estimated using only the output from the beam forming circuit 51 or 52.

The weight calculation unit 73 will be explained below.

The weight calculation unit 73 makes predetermined repetitive calculations based on the reception signal from the terminal 3 using the initial weight (i.e., an initial weight used to form a beam having maximum directionality toward a given area) stored in the initial weight storage device 711 as an initial value, thus calculating a weight used to form a beam (having maximum directionality toward a given area and) having null directionality toward the terminal 3 (i.e., the unit 73 repeats calculations of a weight value to converge the direction of null directionality to that of the terminal 3).

In a practical process for this purpose, a weight vector used to form a beam having a directionality gain in a desired direction is set as an initial value, and null directionality is set in an incoming wave direction while this gain is maintained. Required information is only output power of the beam forming circuit.

The operation sequence for making space-division multiple access (SDMA) for two terminals by the base station of this embodiment will be explained below.

A case will be examined below wherein the two terminals newly subscribe to a service in the order of terminal T1→ terminal T2. As shown in FIG. 3, the is terminal T1 is located within the area A2, and the terminal T2 is located within the area A5.

A registration process when a new terminal subscribes will be explained first, and a process upon making space-division multiple access (SDMA) for two terminals will be explained.

Figure 6:
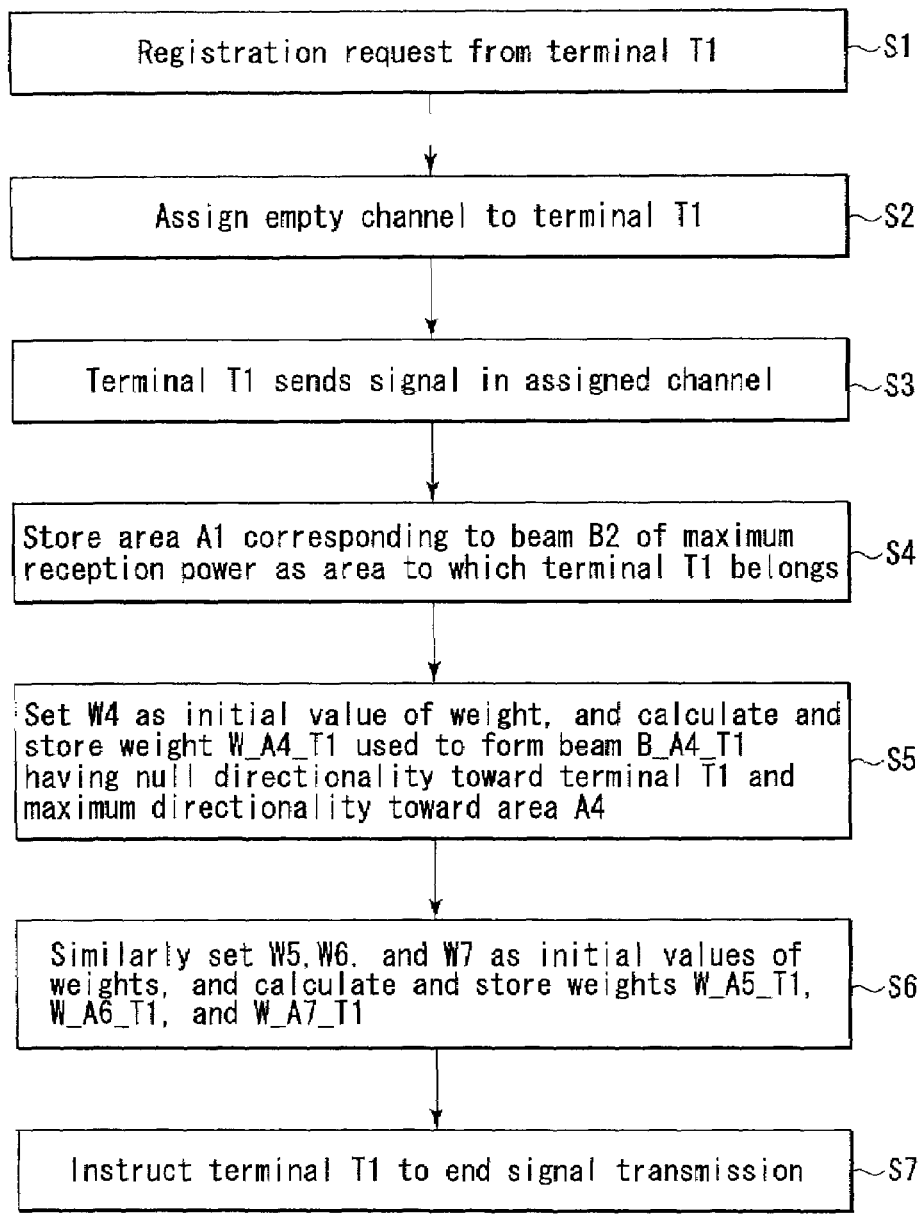
FIG. 6 is a flow chart showing an example of a registration sequence of a terminal according to the first embodiment.

FIG. 6 shows an example of the registration sequence of a new terminal.

The registration sequence when the terminal T1 subscribes as a new terminal will be explained.

The terminal T1 sends a registration request signal to the base station (step S1).

The base station receives the signal from the terminal T1. When the base station recognizes that the received signal is a registration request, it assigns an empty channel to the terminal T1, and instructs the terminal T1 to send a signal with predetermined power in that assigned channel (step S2). The predetermined power value must be appropriately set to eliminate the influence of overreach interference from a neighboring cell.

The terminal T1 sends a signal using the assigned channel and instructed transmission power (step S3).

Figure 7:
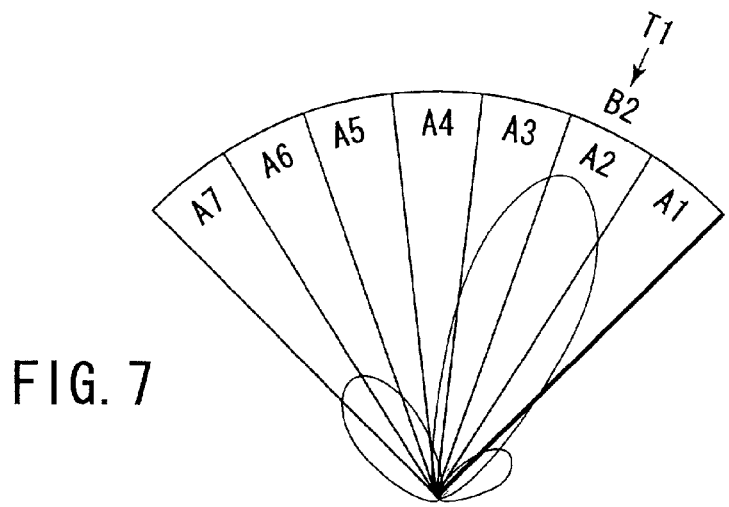
FIG. 7 shows beams formed by initial weights according to the first embodiment.

During this interval, in the base station, the reception state observation device 712 checks the reception power from the terminal T1 upon setting the initial weights W1, W2, W3, . . . , W7 stored in the initial weight storage device 711 in the weighting devices 5111 to 5114 of the beam forming circuit 51, respectively, and stores in the corresponding storage unit 72 the area A2 (FIG. 7) to which maximum directionality of the beam B2 corresponding to the maximum reception power is pointed as an area to which the terminal T1 belongs (step S4).

After that, the weight calculation unit 73 calculates a weight used to form a beam having null directionality toward the terminal T1. At this time, in this example, as for an area to which maximum directionality is pointed, a condition that areas except for the area A2 to which the terminal T1 belongs must be separated a predetermined angle or more from the area to which the terminal T1 belongs is imposed. Also, as another condition, such area is separated one or more areas from the area to which the terminal T1 belongs. Under these conditions, areas to which maximum directionality are pointed are four areas A4, A5, A6, and A7.

Figure 8:
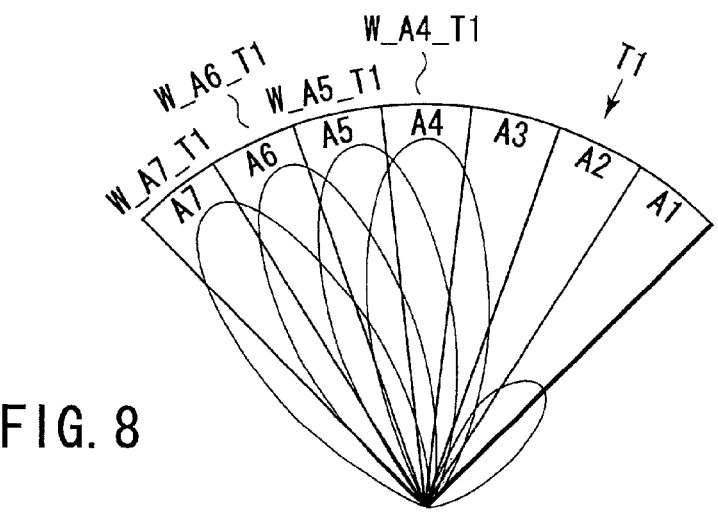
FIG. 8 shows beams having null directionality toward terminals according to the first embodiment.

More specifically, as shown in FIG. 8, weights W_A4_T1, W_A5_T1, W_A6_T1, and W_A7_T1 used to form beams B_A4_T1, B_A5_T1, B_A6_T1, and B_A7_T1 having null directionality toward the terminal T1 and maximum directionality toward the areas A4, A5, A6, and A7, which are separated a predetermined angle or more from the area A2 to which the terminal T1 belongs, of those except for the area A2 are calculated (steps S5 and S6).

In this case, upon calculating the weight W_A4_T1, a weight used to form a beam having null directionality toward the terminal T1 is calculated by repetitive calculations based on the reception signal from the terminal T1 using the initial weight W4 stored in the initial weight storage device 711 as an initial value. Likewise, the weights W_A5_T1, W_A6_T1, and W_A7_T1 are calculated using the initial weights W5, W6, and W7 as initial values.

These weights W_A4_T1, W_A5_T1, W_A6_T1, and W_A7_T1 calculated by the weight calculation unit 73 are stored in the weight storage unit 74 (steps S5 and S6).

When maximum directionality is separated a predetermined angle or more from null, as described above, the gain difference between maximum directionality and null can be set to be a predetermined value or more.

With the aforementioned processes, since registration of the terminal T1 is complete, the base station instructs the terminal T1 to end signal transmission (step S7).

Subsequently, assume that the terminal T2 newly subscribes to this service.

Figure 9:
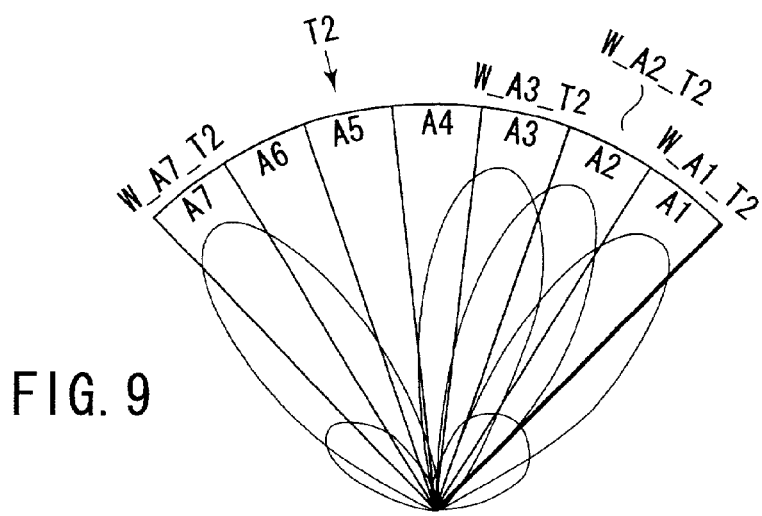
FIG. 9 shows beams having null directionality toward terminals according to the first embodiment.

In this case as well, the same sequence as in FIG. 6 is executed. That is, the area A5 to which maximum directionality of the beam B5 corresponding to the maximum reception power from the terminal T2 is pointed is stored as an area to which that terminal belongs in the correspondence storage unit 72. After that, as shown in FIG. 9, weights W_A1_T2, W_A2_T2, W_A3_T2, and W_A7_T2 used to form beams B_A1_T2, B_A2_T2, B_A3_T2, and B_A7_T2 having null directionality toward the terminal T2 and maximum directionality toward the areas A1, A2, A3, and A7, which are separated a predetermined angle or more from the area A5 to which the terminal T2 belongs, of those except for the area A5 are calculated. In this case, the initial weights W1, W2, W3, and W7 are used as initial values. The weights calculated by the weight calculation unit 73 are stored in the weight storage unit 74. With the aforementioned process, since registration of the terminal T2 is complete, the base station instructs the terminal T2 to end signal transmission.

FIG. 10 shows an example of the storage contents of the correspondence storage device 72 upon completion of registration of the terminals T1 and T2.

In this embodiment, the registration sequence for other terminals T3, T4, . . . when these terminals T3, T4, . . . newly subscribe to the service after the terminals T1 and T2 is executed in the same manner as described above.

A process upon making space-division multiplex access (SDMA) for the two terminals T1 and T2 will be explained below.

FIG. 11 shows an example of the processing sequence in this case.

The terminals T1 and T2 send communication request signals to the base station (step S8).

The base station receives the signals from the terminals T1 and T2. When the base station recognizes that these signals are communication requests, since the weight W_A5_T1 used to form the beam B_A5_T1 having null directionality toward the terminal T1 and maximum directionality toward the area A5 to which the terminal T2 belongs, and the weight W_A2_T2 used to form the beam B_A2_T2 having null directionality toward the terminal T2 and maximum directionality toward the area A5 to which the terminal T1 belongs are stored in the weight storage device 74, the weight selection unit 75 sets, e.g., the weight W_A5_T1 in the weighting devices 5111 to 5114 of the beam forming circuit 51, and the weight W_A2_T2 in the weighting devices 5211 to 5214 of the beam forming circuit 52 (step S9). Of course, the correspondence between the weights and beam forming circuits may be different from (reversed to) that described above.

Figure 12:
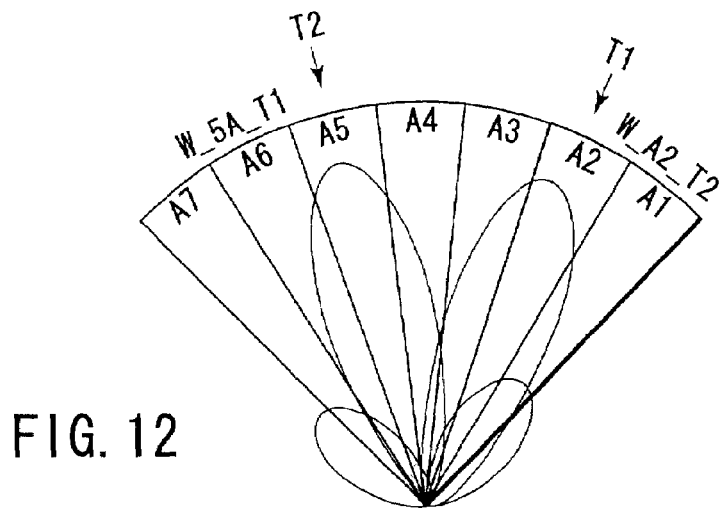
FIG. 12 shows beams upon space-division multiplex access for two terminals according to the first embodiment.

FIG. 12 exemplifies the states of the beams at that time.

After that, an identical channel is assigned to the terminals T1 and T2 (step S10).

In this way, signals from the terminals T1 and T2 can be respectively received by the receivers 62 and 61 without interfering with each other (of course, when the correspondence between the weights and beam forming circuits is reversed to that described above, signals from the terminals T1 and T2 are respectively received by the receivers 61 and 62).

When a communication is made with only one terminal (e.g., T1) after the weights that consider null directionality are calculated, the communication may be made using the initial weight (e.g., W2) used to form a beam having maximum directionality toward the area A2 to which the terminal T1 belongs, or using one of weights (e.g., W_A2_T2) used to form a beam having maximum directionality toward the area A2 to which the terminal T1 belongs and null directionality toward a terminal in another area.

(Second Embodiment)

Since this embodiment is basically the same as the first embodiment, differences between this embodiment and the first embodiment will be mainly explained below.

Figure 13:
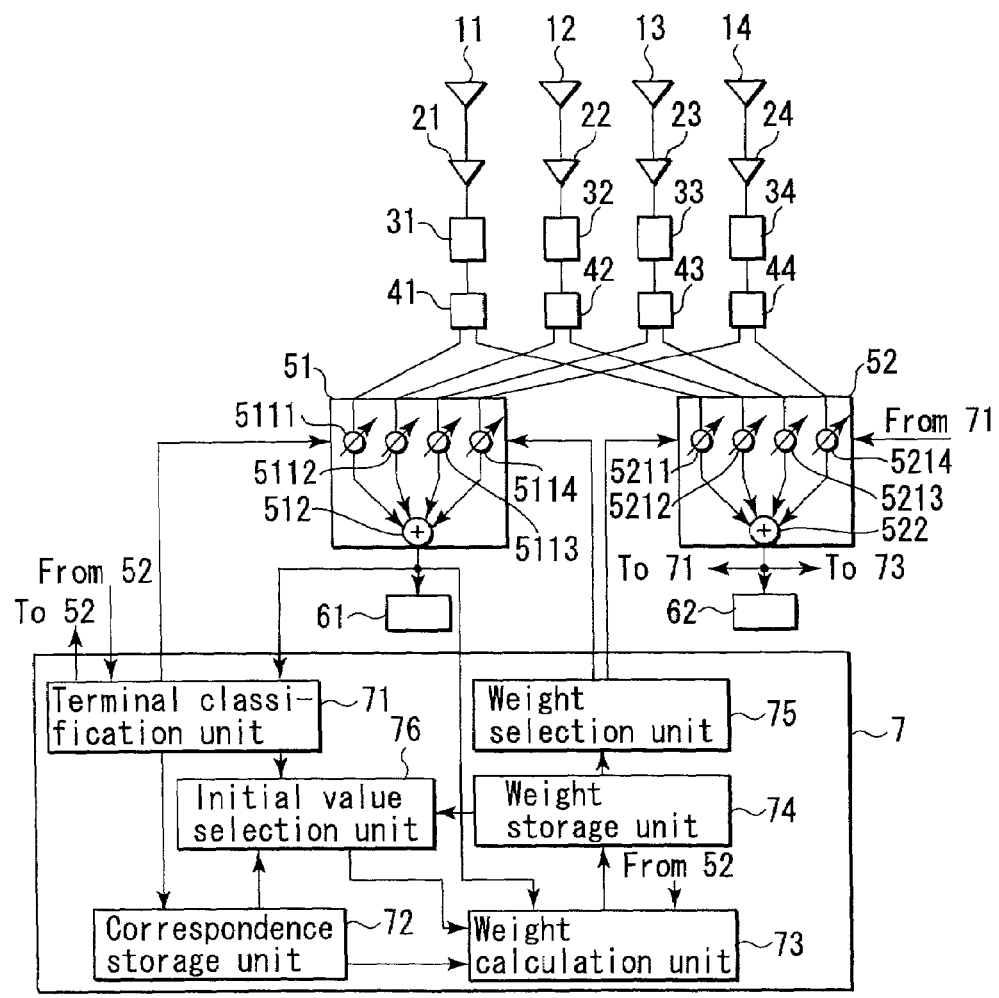
FIG. 13 is a block diagram showing an example of an adaptive array according to the second embodiment of the present invention.

FIG. 13 shows an example of the arrangement of an adaptive array arranged in a base station according to this embodiment.

As shown in the example of the arrangement of the adaptive array in FIG. 13, this embodiment is different from the first embodiment in that an initial value selection unit 76 is added to the example of the arrangement of the adaptive array of the first embodiment shown in FIG. 2.

This initial value selection unit 76 selects the weight stored in the initial weight storage device 711 of the terminal classification unit 71 or that (used to form a beam having null directionality toward a given terminal and maximum directionality toward the range of a given area) stored in the weight storage unit 74 on the basis of the registration record (terminal-area correspondence information) stored in the correspondence storage unit 72, and inputs the selected weight as an initial value to the weight calculation unit 73.

When the weight storage unit 74 stores a plurality of weights that can be selected, one of these weights can be selected based on a predetermined criterion (e.g., random or appropriate order, a weight generated first, a weight generated latest, or the like).

A process executed when a terminal T3 which belongs to the same area as the terminal T2 newly subscribes to a service after registration of the terminals T1 and T2 will be explained below.

The process at that time is basically the same as that in the registration sequence of the terminals T1 and T2 mentioned above, except that the initial value selection unit 76 selects an initial value of a weight in weight calculations as needed.

Figures 14, 15:
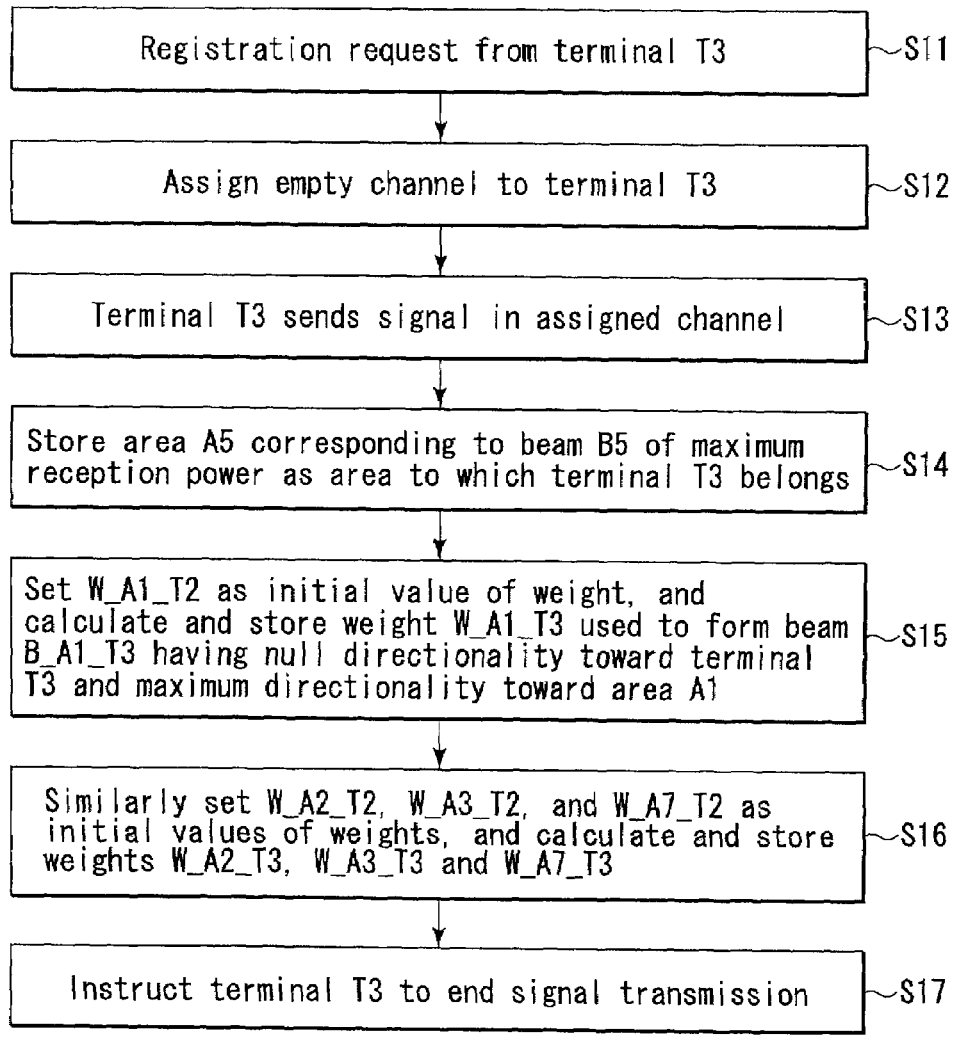
FIG. 14 is a flow chart showing an example of a registration sequence of a terminal according to the second embodiment.
FIG. 15 is a table showing an example of the storage contents of a correspondence storage unit according to the second embodiment.
Figure 16:
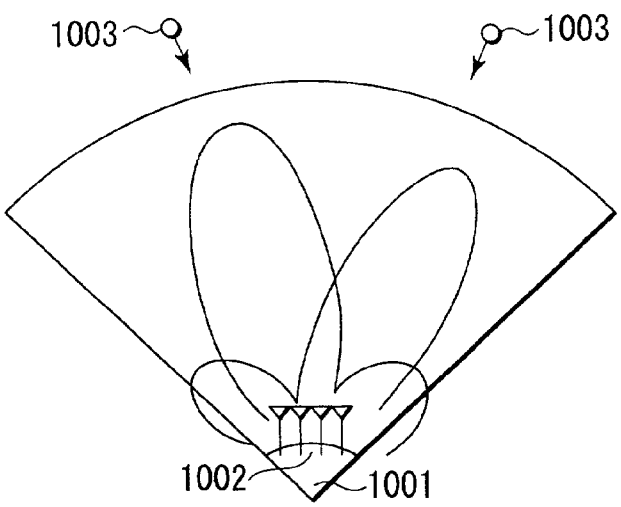
FIG. 16 is a view for explaining a conventional point-to-multipoint system.
Figure 17:
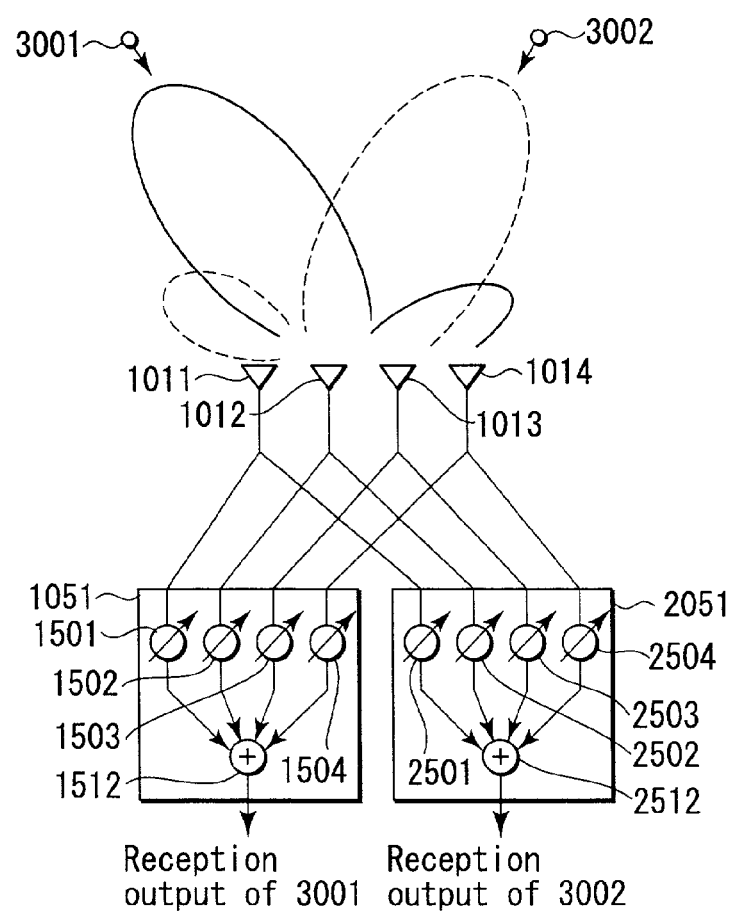
FIG. 17 is a block diagram showing an example of the arrangement of a conventional adaptive array when the multiplexing degree is 2.

FIG. 14 shows an example of the processing sequence in such case (which has basically the same flow of sequence as in FIG. 6).

The terminal T3 sends a registration request signal to the base station (step S11).

The base station receives the signal from the terminal T3. When the base station recognizes that the received signal is a registration request, it assigns an empty channel to the terminal T3, and instructs the terminal T3 to send a signal with predetermined power (step S12).

The terminal T3 sends a signal with the designated power in the assigned channel (step S13).

The base station stores the area A5 to which maximum directionality of the beam B5 corresponding to the maximum reception power from the terminal T3 in the correspondence storage unit 72 is pointed as an area to which that terminal belongs (step S14).

FIG. 15 shows an example of the storage contents of the correspondence storage unit 72 upon completion of registration of the terminal T3.

After that, the initial value selection unit 76 selects an initial value of a weight to be input to the weight calculation unit 73. Initially, the initial value selection unit 76 looks up the contents of the correspondence storage unit 72. When the unit 76 detects that the terminal T2 has already been registered in the area A5 to which the terminal T3 belongs, it inputs weights W_A1_T2, W_A2_T2, W_A3_T2, and W_A7_T2, which are stored in the weight storage unit 74 and have null directionality toward the terminal T2, to the weight calculation unit 73 as initial values of weights. If a plurality of terminals have already been registered in the area A5 to which the terminal T3 belongs, a weight corresponding to a minimum reception signal from the terminal T3 may be used as an initial value.

If the terminal T3 belongs to an area different from those of the already registered terminals T1 and T2, it is detected that no terminal has been registered yet in the area to which the terminal T3 belongs. In such case, the initial weights W1, W2, W3, and W7 stored in the initial weight storage device 711 of the terminal classification unit 71 are input to the weight calculation unit 73 as initial values of weights (in this case, the same calculations as in the first embodiment are consequently made).

After that, the weight calculation unit 73 calculates weights W_A1_T3, W_A2_T3, W_A3_T3, and W_A7_T3 used to form beams B_A1_T3, B_A2_T3, B_A3_T3, and B_A7_T3 having null directionality toward the terminal T3 and maximum directionality toward the areas A1, A2, A3, and A7, which are separated a predetermined angle or more from the area A5 to which the terminal T3 belongs, of those except for the area A5 (steps S15 and S16).

The weights calculated by the weight calculation unit 73 are stored in the weight storage unit 74 (steps S15 and S16).

With the aforementioned processes, since registration of the terminal T3 is complete, the base station instructs the terminal T3 to end signal transmission (step S17).

In this manner, when another terminal has already been registered in an identical area, the weights calculated for that already registered terminal can be used as initial values. In this case, since beams having null directionality toward the vicinities of the direction of the terminal T3, have already been formed while the initial values of the weights are set, the number of repetitive calculations required to calculate weights used to form beams having null directionality toward the terminal T3 and maximum directionality toward the areas A1, A2, A3, and A7, can be reduced. Therefore, channels to be assigned to the terminal T3 for null control can be reduced.

Note that the operation sequence upon making space-division multiplex access (SDMA) for two terminals by the base station of this embodiment is the same as that in the first embodiment.

For example, upon making space-division multiplex access (SDMA) for the two terminals T1 and T3, the weight $W_{13}$ A5_T1 used to form the beam B_A5_T1 having null directionality toward the terminal T1 and maximum directionality toward the area A5 to which the terminal T2 belongs, and the weight W_A2_T3 used to form the beam B_A2_T3 having null directionality toward the terminal T3 and maximum directionality toward the area A5 to which the terminal T1 belongs, are used.

In the examples described in the first and second embodiments, the multiplexing degree is 2. Of course, the present invention can be applied to a case wherein the multiplexing degree is 3 or more. Even in such case, the number of weights to be held can be smaller than that in the prior art.

For example, when the multiplexing degree is 3, assuming that terminals T1 to T3 simultaneously make communications using a single channel, and respectively belong to areas A1, A3, and A5, for the terminal T1, a weight W_A1_T2_T3 used to form a beam having null directionality toward the terminals T2 and T3 and maximum directionality toward the area A1 to which the terminal T1 belongs, for the terminal T2, a weight W_A3_T1_T3 used to form a beam having null directionality toward the terminals T1 and T3 and maximum directionality toward the area A3 to which the terminal T2 belongs, and for the terminal T3, a weight W_A5_T1_T2 used to form a beam having null directionality toward the terminals T1 and T2 and maximum directionality toward the area A5 to which the terminal T3 belongs, can be respectively set in three beam forming circuits.

Even when the multiplexing degree are 3 or more, the same effect can be obtained when the initial value selection unit 76 of the second embodiment selects initial values for weight calculations.

As described above, according to this embodiment, an area to which a given terminal belongs of a plurality areas obtained by dividing the cover area of the base station in accordance with direction is estimated in place of preparing for orthogonal beams in correspondence with combinations of terminals, and weights used to form a beam having null directionality toward a terminal and maximum directionality toward a given area are held, thus reducing the number of weights to be held.

Also, according to this embodiment, weights used to form beams having maximum directionality toward a plurality of areas obtained by dividing the cover area of the base station are pre-stored, and an area to which maximum directionality of a beam which allows reception of a signal from a terminal with the highest reception power or signal to noise ratio upon setting these weights in the weighting devices is pointed is determined as an area to which the terminal belongs. Hence, an area to which the terminal belongs can be estimated using only the output from the beam forming means.

Furthermore, according to this embodiment, upon calculating weights used to form beams having null directionality toward a terminal and maximum directionality toward a given area, since weights used to form beams having maximum directionality toward the given area are set as initial values, the number of required repetitive calculations can be reduced.

Moreover, according to this embodiment, upon calculating weights used to form beams having null directionality toward a terminal and maximum directionality toward a given area, since weights used to form beams having null directionality toward the vicinities of the direction of the terminal are set as initial values, the number of required repetitive calculations can be reduced.

In addition, according to this embodiment, since weights used to form beams having null directionality toward a terminal and maximum directionality toward areas which are separated by the area to which the terminal belongs of those except for the area to which the terminal belongs are calculated, maximum directionality is separated a predetermined angle or more from null, thus setting the gain difference between maximum directionality and null to be a predetermined value or more.

(Third Embodiment)

In the third embodiment, the present invention is applied to an IEEE802.11 wireless LAN system using CSMA/CA. Since the conventional IEEE802.11 wireless LAN system using CSMA/CA does not make integrated control of packet transmission, as described above, it is difficult to obtain a situation in which only a terminal to be suppressed or base station transmits packets. As a result, a terminal of the self cell transmits packets in place of the terminal or base station to be suppressed, and unwanted beams that suppress such packets are formed. This embodiment solves this problem.

Figure 18:
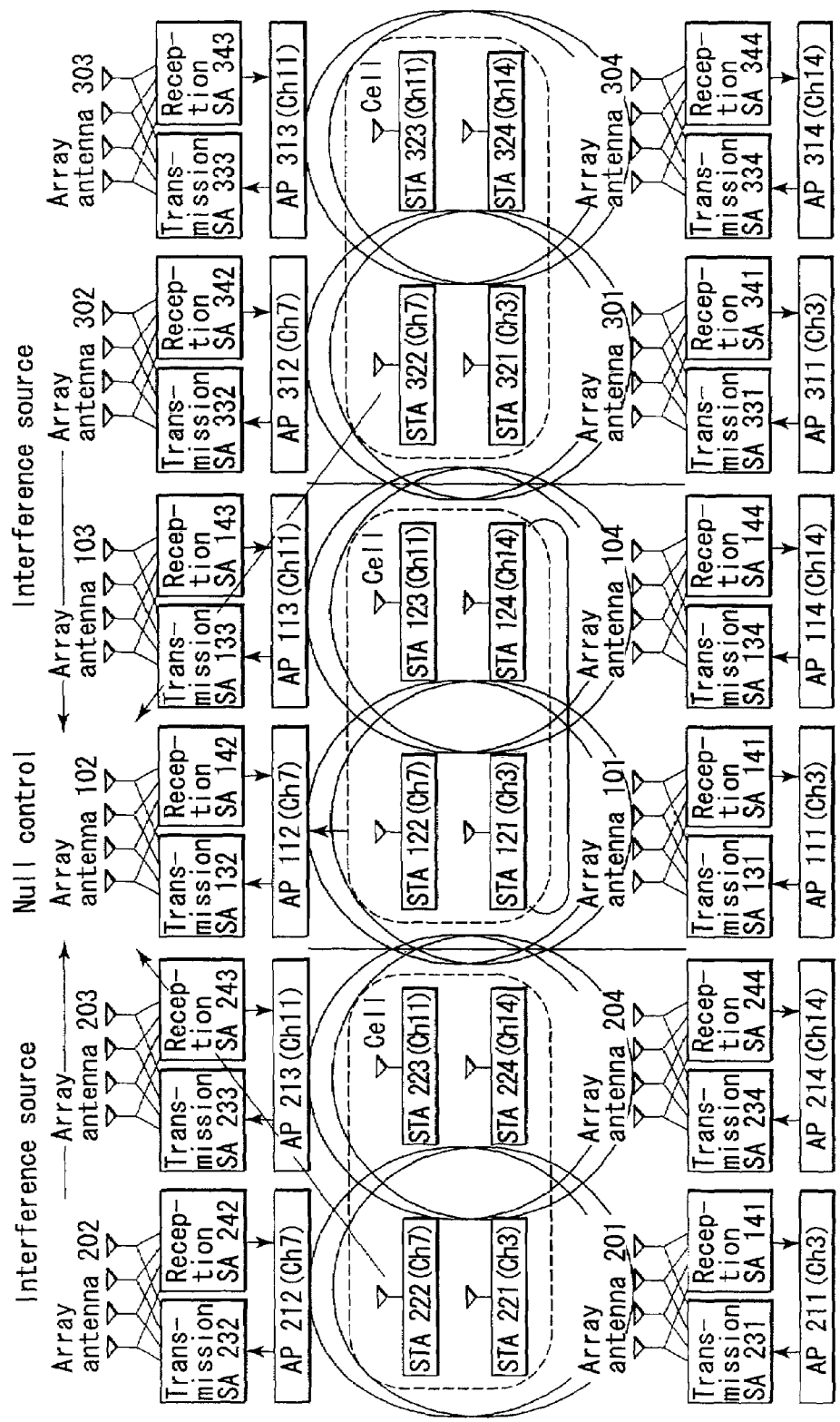
FIG. 18 is a diagram for explaining a wireless communication system according to the third embodiment of the present invention.

FIG. 18 shows an example of a wireless communication system according to the third embodiment of the present invention.

Base stations (AP) 111 to 114, 211 to 214, and 311 to 314 respectively comprise transmission adaptive arrays (transmission SA) 131 to 134, 231 to 234, and 331 to 334 and reception adaptive arrays (reception SA) 141 to 144, 241 to 244, and 341 to 344, which share array antennas 101 to 104, 201 to 204, and 301 to 304.

In FIG. 18, the transmission and reception adaptive arrays share the array antennas. Alternatively, the transmission and reception adaptive arrays may use independent array antennas.

An arbitrary location in a cell is covered by transmission and reception beams formed by the adaptive arrays of at least one AP. With this arrangement, terminals (STA) 121 to 124, 221 to 224, and 321 to 324 located at arbitrary locations in cells can communicate with corresponding APs.

This embodiment will exemplify a case wherein interference waves from the APs 312 and 212, which become interference sources for the AP 112 that uses Ch7, are reduced lower than the carrier sense level by the reception SA 142.

The reason why objects to be suppressed are limited to APs, and the suppression level is limited to the carrier sense level is to reduce the required number of antenna elements, and to reduce the apparatus scale. Although the objects to be suppressed are limited, if the AP traffic is heavier than the STA, as packet transmission delay of the AP due to carrier sense of packets sent from a neighboring AP mainly deteriorates the throughput of the entire system, the effect of improving the throughput according to the present invention is great.

Figure 19:
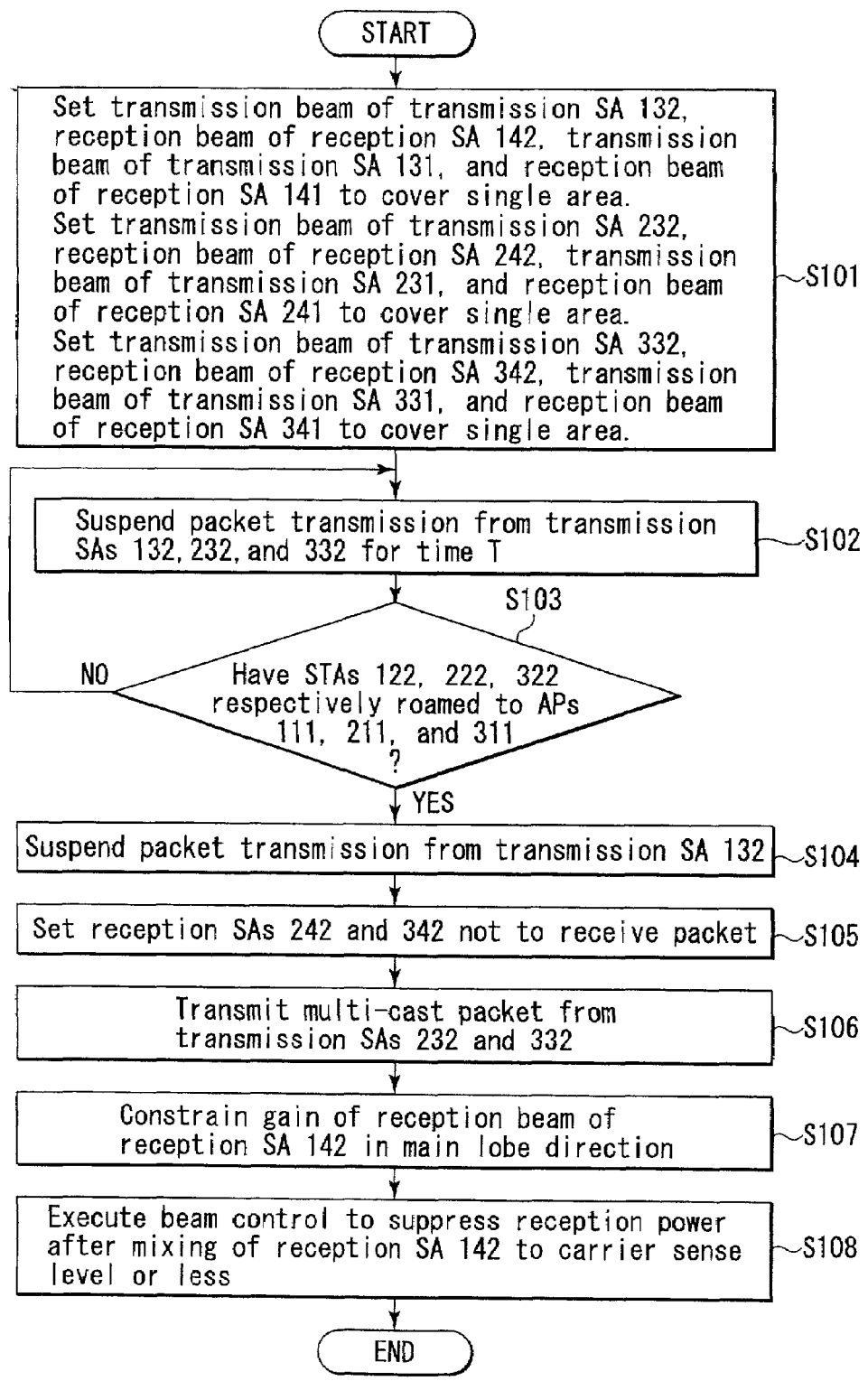
FIG. 19 is a flow chart showing a control method of an adaptive array for a wireless base station according to the third embodiment.

FIG. 19 shows a beam control method of the SA 142 in the third embodiment of the present invention.

A transmission beam of the transmission SA 132, a reception beam of the reception SA 142, a transmission beam of the transmission SA 131, and a reception beam of the reception SA 141 are set to cover a single area.

Also, a transmission beam of the transmission SA 232, a reception beam of the reception SA 242, a transmission beam of the transmission SA 231, and a reception beam of the reception SA 241 are set to cover a single area.

Furthermore, a transmission beam of the transmission SA 332, a reception beam of the reception SA 342, a transmission beam of the transmission SA 331, and a reception beam of the reception SA 341 are set to cover a single area (step 101).

With this arrangement, roaming of the STAs 122, 222, and 322 to the APs 111, 211, and 311 can be made.

Subsequently, packet transmission from the transmission SAs 132, 232, and 332 is suspended for time T (step 102). In this way, since the STAs 122, 222, and 322 cannot communicate with the APs 112, 212, and 312, they roam to the APs 112, 212, and 312 after a predetermined period of time.

It is checked if the STAs 122, 222, and 322 respectively roam to the APs 112, 212, and 312 (step 103). This operation can be made if the MAC layer can be monitored.

After confirmation of roaming to the STAs 122, 222, and 322, packet transmission from the transmission SA 132 is suspended (step 104). In this manner, since the AP 112 whose beam control is underway sends no beacon, roaming from the STAs to the AP 112 can be prevented.

The reception SAs 242 and 342 are set not to receive any packets (step 105). More specifically, the reception SAs 242 and 342 may be disconnected from the APs 212 and 312 by switches. Alternatively, the reception gains of the reception SAs 242 and 342 may be lowered. In this way, since the back-off process of the APs 212 and 312 due to carrier sense can be avoided, a problem of packet transmission delay can be solved.

The transmission SAs 232 and 332 send multi-cast packets (step 106). In this manner, since the multi-cast packets do not require any ACK reception from the STAs, and the back-off process due to ACK non-reception can be avoided, a problem of packet transmission delay can be solved. Especially, this embodiment is effective when the reception SAs 242 and 342 are set not to receive any packets.

The gain of the reception beam of the reception SA 142 in the main lobe direction is constrained (step 107).

Beam control is made based on the direction-constrained power minimization method, so that the reception power after combining of the reception SA 142 becomes equal to or lower than the carrier sense level (step 108).

This embodiment uses the direction-constrained power minimization method as a beam control algorithm. This algorithm suppresses all received signals as interference while maintaining a gain in a specific direction. Therefore, when a situation in which only interference waves from only the APs 212 and 312 arrive is formed, and the direction-constrained power minimization method is used, a beam that covers a specific area in the self cell and removes interference waves from the APs 212 and 312 can be formed.

With this control method, the number of interference waves as objects to be suppressed can be limited to reduce the apparatus scale, a situation in which only interference waves as objects to be suppressed are present can be set, and a beam that removes these interference waves can be formed.

Since the object to be suppressed is limited to a neighboring AP, this embodiment is particularly effective when the AP traffic is heavier than the STA. Since the suppression level is set to be less than the carrier sense level, packet transmission delay of the AP due to carrier sense of packets sent from a neighboring AP can be avoided, thus improving the throughput of the entire system.

In this embodiment, setups of the APs and transmission and reception SAs may be locally directly controlled or may be controlled by a controller that makes integrated control. Upon making integrated control, either wired or wireless control may be used.

In this embodiment, a pair of transmission and reception SAs are provided to each AP. Alternatively, a plurality of APs may share a pair of transmission and reception SAs.

Figure 20:
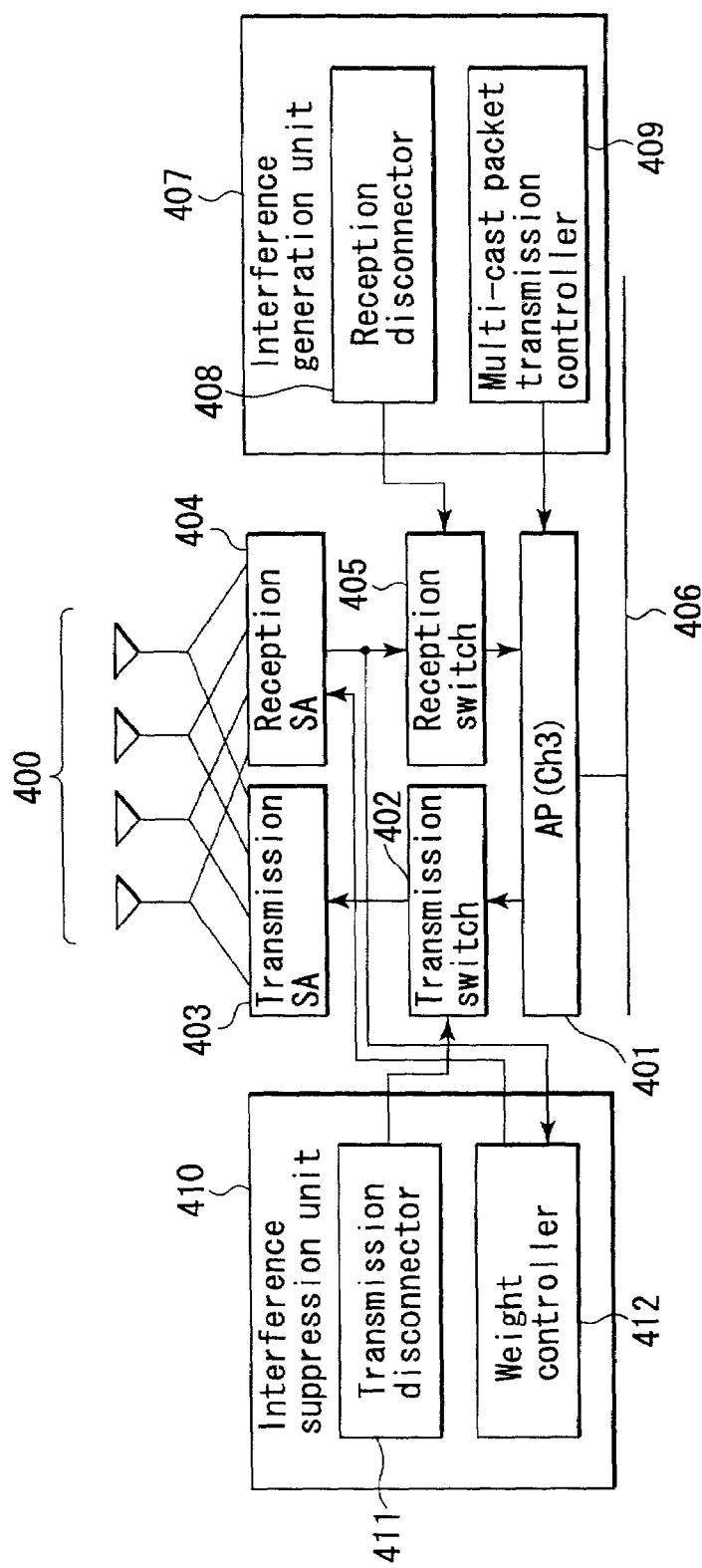
FIG. 20 is a diagram for explaining the internal arrangement of a controller of the adaptive array according to the third embodiment of the present invention.

The internal arrangement of a controller of the adaptive array will be described below using FIG. 20.

Reception signals received by an array antenna 400 are respectively weighted by a reception beam forming circuit 404 to form a beam. The output from the reception beam forming circuit 404 is input to a reception switch 405. When the reception switch is ON, the output from the reception beam forming circuit 404 is input to an AP 401.

A packet sent from the AP 401 is input to a transmission switch 402. When the transmission switch 402 is ON, a signal sent from the AP 401 is input to a transmission beam forming circuit 403. After the input signal is weighted, that signal is transmitted from the array antenna, thus forming a beam.

An interference generation unit 407 comprises a reception disconnector 408 and multi-cast packet transmission controller 409. The reception disconnector 408 sets the reception switch 405 OFF. The multi-cast packet transmission controller 409 sends a command to the AP 401 to send a multi-cast packet.

With this arrangement, when another AP controls weights to have the AP 401 as an interference source, since the AP 401 does not execute a back-off process due to carrier sense or ACK non-reception, a problem of packet transmission delay can be solved.

An interference suppression unit 410 comprises a transmission disconnector 411 and weight controller 412. The transmission disconnector 411 sets the transmission switch 402 OFF. The weight controller 412 calculates and sets weights in the reception beam forming circuit 404 on the basis of the output from the reception beam forming circuit 404.

With this arrangement, when another AP controls weights to have the AP 401 as an interference source, since no beacon is sent to a terminal, the terminal can be prevented from subscribing the AP 401 whose beam control is underway by roaming. Therefore, a situation in which no interference from the terminal is present can be formed. Also, the transmission signal itself from the AP 401 can be prevented from being received by the array antenna 400 to adversely influence the beam control.

In this embodiment, the AP 401 is directly controlled by only the multi-cast packet transmission controller, but may be controlled via the backbone 406. In such case, the AP 401 does not require any additional functions to implement this embodiment, and an existing AP can be used. Also, the interference generation unit 407 and interference suppression unit 410 can be controlled via the backbone 406.

(Fourth Embodiment)

Since this embodiment is basically the same as the third embodiment, only a difference between this embodiment and the third embodiment will be mainly explained below.

Figure 21:
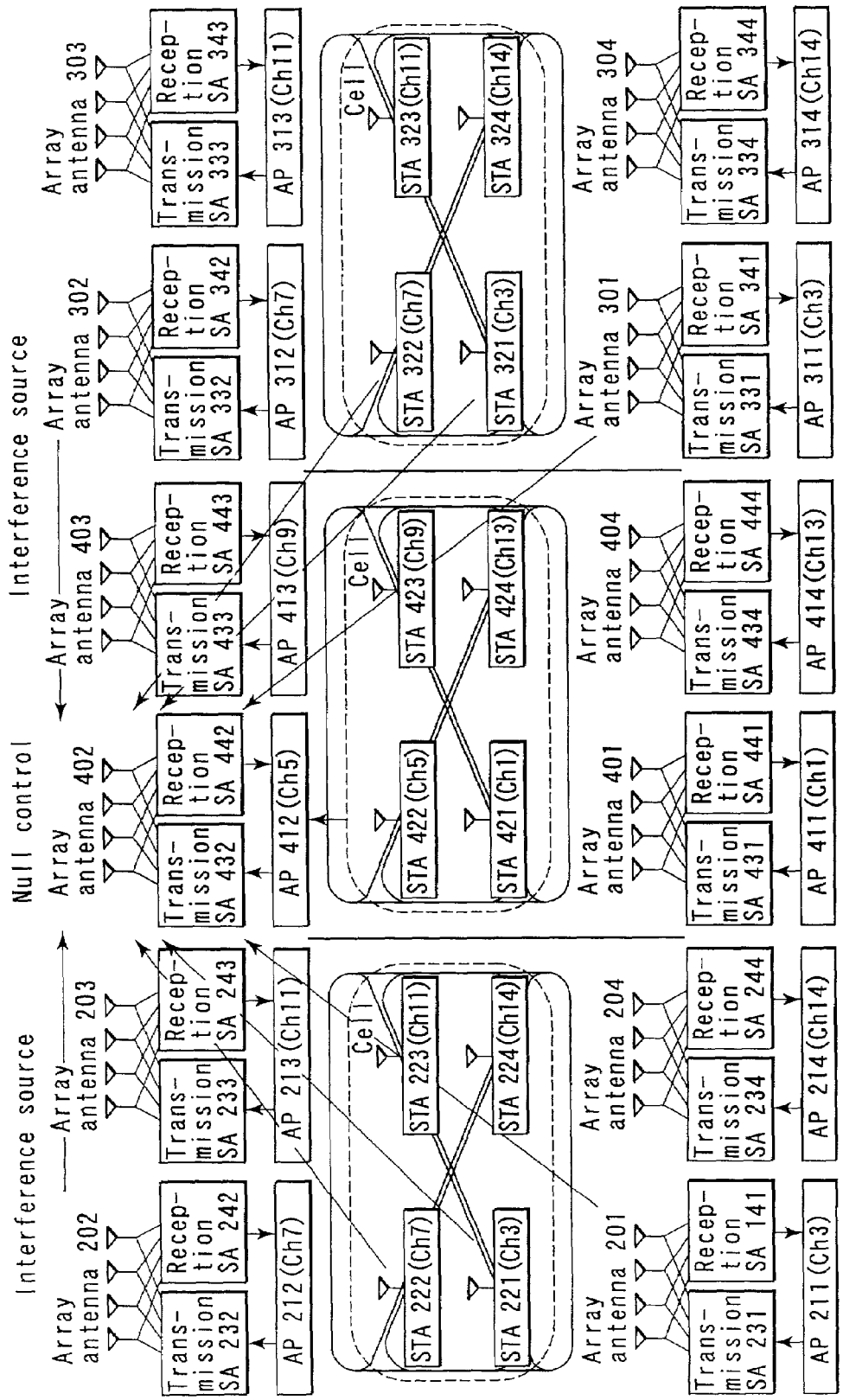
FIG. 21 is a diagram for explaining a wireless communication system according to the fourth embodiment of the present invention.
Figure 22:
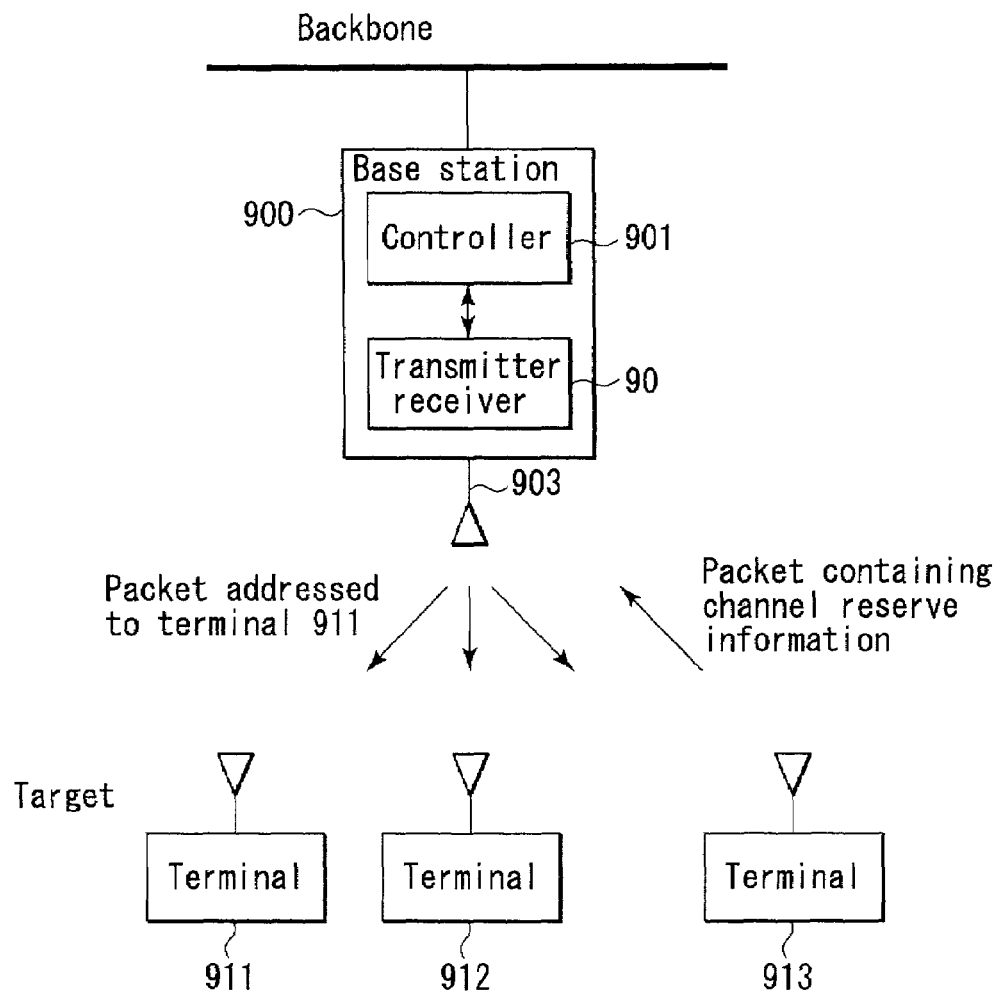
FIG. 22 is a diagram for explaining a conventional IEEE802.11 wireless LAN system using CSMA/CA.
Figure 23:
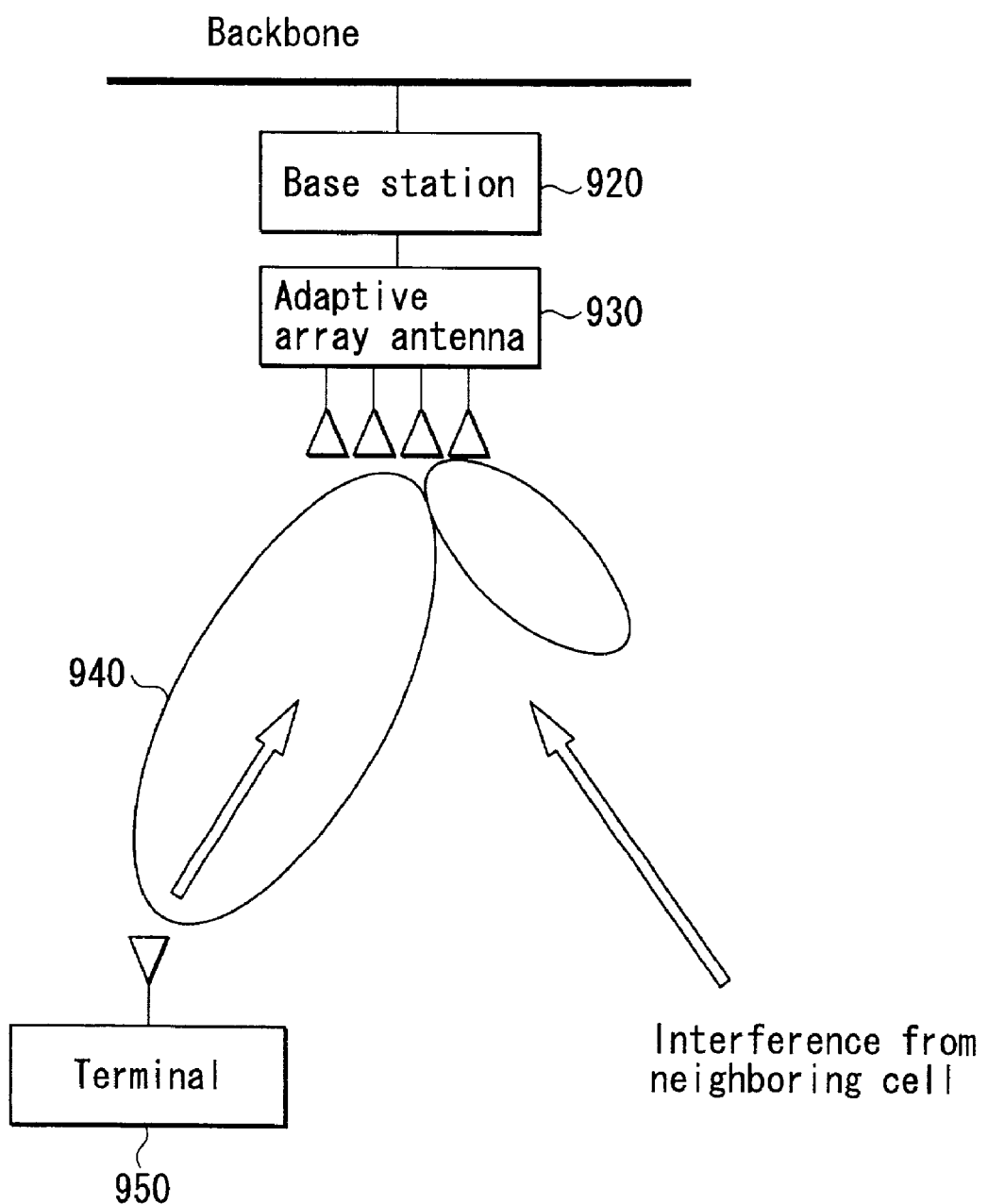
FIG. 23 is a diagram for explaining conventional adaptive array antennas.

FIG. 21 shows an example of a wireless communication system according to the fourth embodiment of the present invention.

As shown in FIG. 21, this embodiment is different from the third embodiment in that neighboring cells use different radio channels, and an arbitrary location in a cell is covered by transmission and reception beams formed by adaptive arrays of at least three APs.

Since neighboring cells use different radio channels, the interference level from the neighboring AP lowers, resulting in a small interference suppression amount and a small apparatus scale.

Since each cell is covered by three beams, the STA can roam to two APs upon beam control.

A case will be exemplified below wherein interference waves from APs 211, 212, 311, and 312, which become interference sources for an AP 412 that uses Ch5, are reduced to less than the carrier sense level. STAs 422, 221, 222, 321, and 322, which are associated with APs 412, 211, 212, 311, and 312, can roam to APs 421 or 413, 214, 213, 314, and 313.

According to the third and fourth embodiments of the present invention, since the object to be suppressed is limited to a neighboring AP, and the suppression level is limited under the carrier sense level, the number of antenna elements can be reduced, and the apparatus scale can become small. Although the objects to be suppressed are limited, if the AP traffic is heavier than the STA, as packet transmission delay of the AP due to carrier sense of packets sent from a neighboring AP mainly deteriorates the throughput of the entire system, the effect of improving the throughput according to the present invention is great.

Since an arbitrary location in a cell is covered by transmission and reception beams of at least two APs, and the direction-constrained power minimization method is executed after roaming of the STA, a beam that suppresses a packet to be sent from the STA can be prevented from being formed. Also, the STA can communicate with another AP even during beam control.

Since an AP whose beam control is underway does not send any beacon, roaming of the STA can be prevented.

Since the reception SA of an interfering AP is set not to receive any packet, the interfering AP can be prevented from executing a back-off process due to carrier sense, thus solving a problem of packet transmission delay.

Since an interfering AP sends a multi-cast packet, which does not require ACK reception from the STA, and a back-off process due to ACK non-reception can be avoided, a problem of packet transmission delay can be solved.

Since neighboring cells use different radio channels, the interference level from a neighboring AP lowers, resulting in a small interference suppression amount and a small apparatus scale.

Since an arbitrary location in a cell is covered by three beams, the STA can roam to two APs during beam control.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wireless communication system which allows simultaneous communications with a plurality of terminals by space-division multiplex access, comprising:

a plurality of antenna elements that receive a signal transmitted from the terminals;

a plurality of beam forming units configured to output reception signals corresponding to beams having predetermined directionality patterns by weighting and combining reception signals received by said plurality of antenna elements; and a controller configured to set weight vectors used to control weighting and combining in said plurality of beam forming units, wherein said controller comprises:

a reception unit configured to receive a registration request from an unregistered terminal;

a calculation unit configured to calculate and store at least one of said weight vectors used to form a beam having: null directionality toward the unregistered terminal; and maximum directionality toward a specific area other than an area where the unregistered terminal is located of areas obtained by dividing a cover area covered by the wireless communication system;

a communication unit configured to simultaneously communicate by space-division multiplex access with a first terminal located within a first area of the areas obtained by dividing the cover area covered by the self system in accordance with the direction, and a second terminal located within a second area different from the first area;

a first control unit configured to control, for the first terminal, the beam forming unit corresponding to the first terminal using a first weight vector used to form a beam having null directionality toward the second terminal and maximum directionality toward the first area to which the first terminal belongs; and a second control unit configured to control, for the second terminal, the beam forming unit corresponding to the second terminal using a second weight vector used to form a beam having null directionality toward the first terminal and maximum directionality toward the second area to which the second terminal belong.

2. A system according to claim 1, wherein upon calculating the weight vector for the unregistered terminal, said controller calculates the weight vector in correspondence with each of cases in which areas separated not less than a predetermined angle from the area to which the terminal belongs are set as the specific area.

3. A system according to claim 1, wherein upon calculating the weight vector for the unregistered terminal, said controller calculates the weight vector used to form the beam having null directionality toward the terminal by making predetermined repetitive calculations on the basis of the reception signal from the terminal using a corresponding one of initial weight vectors which are prepared for the respective areas and are used to form beams having maximum directionality toward the areas as an initial value of the weight vector.

4. A system according to claim 3, wherein said controller stores terminal-area information indicating an area to which a registered terminal belongs and looks up the terminal-area information upon calculating the weight vector for the unregistered terminal, and if a registered terminal which belongs to the same area as the unregistered terminal is found, said controller calculates the weight vector for the unregistered terminal using the weight vector already calculated for the registered terminal as an initial value of the weight vector.

5. A system according to claim 1, wherein upon obtaining the area to which the terminal belongs, said controller compares reception states of signals from the terminal when initial weight vectors which are prepared in advance for the respective areas and are used to form beams having maximum directionality toward the areas are set in the beam forming unit, and determines an area to which maximum directionality of a beam formed by a weight vector in a best reception state of the signal from the terminal is pointed as the area to which the terminal belongs.

6. A system according to claim 5, wherein the best reception state is a reception state with maximum reception power or signal to noise power ratio.

* * * * *